United States Patent
Jiang et al.

(10) Patent No.: US 11,410,819 B2
(45) Date of Patent: Aug. 9, 2022

(54) METHOD FOR PREPARING SUPER CAPACITOR ELECTRODE MATERIAL NI DOPED COP$_3$/FOAM NICKEL

(71) Applicant: University of Electronic Science and Technology of China, Sichuan (CN)

(72) Inventors: Jing Jiang, Sichuan (CN); Zhipeng Li, Sichuan (CN); Xinrui He, Sichuan (CN); Yalin Hu, Sichuan (CN); Yi Niu, Sichuan (CN); Ting Zhou, Sichuan (CN); Chao Wang, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 0 days.

(21) Appl. No.: 17/065,444

(22) Filed: Oct. 7, 2020

(65) Prior Publication Data
US 2021/0090819 A1  Mar. 25, 2021

(30) Foreign Application Priority Data
Oct. 8, 2019 (CN) .......................... 201910949326.1

(51) Int. Cl.
*H01G 11/30* (2013.01)
*H01G 11/86* (2013.01)
(Continued)

(52) U.S. Cl.
CPC ............... *H01G 11/30* (2013.01); *H01B 1/06* (2013.01); *H01G 11/04* (2013.01); *H01G 11/26* (2013.01);
(Continued)

(58) Field of Classification Search
None
See application file for complete search history.

(56) References Cited

PUBLICATIONS

Zhang et al., "Porous NiCoP nanowalls as promising electrode . . . for superconductors" Science China Materials, vol. 62, Issue 8: 1115-1126, published Apr. 4, 2019; PDF available online at https://www.sciengine.com/publisher/scp/journal/SCMs/62/8/10.1007/s40843-019-9405-8?slug=fulltext (Year: 2019).*

(Continued)

*Primary Examiner* — Katie L. Hammer (57) ABSTRACT

A method for preparing a supercapacitor electrode material Ni doped CoP$_3$/Ni foam is provided, and the CoP$_3$ is applied to the supercapacitor for the first time. The method belongs to a technical field of synthesis and preparation of supercapacitor materials. The present invention adopts a low-temperature phosphating process to prepare the Ni-doped CoP$_3$/foamed nickel as the electrode material of the supercapacitor, so as to provide advantages such as simple synthesis process, easy control, low cost and high specific capacity. The supercapacitor electrode material Ni doped CoP$_3$/Ni foam prepared by the present invention has a hierarchical structure and a large specific surface area, which is beneficial to shorten an ion transmission path, reduce an interface resistance between the electrode material and electrolyte, provide more active sites, and provide a higher specific capacity in alkaline electrolyte. The electrode material shows great potential in electrochemical energy storage.

1 Claim, 5 Drawing Sheets

(51) Int. Cl.
- H01B 1/06 (2006.01)
- H01G 11/70 (2013.01)
- H01G 11/04 (2013.01)
- H01G 11/26 (2013.01)
- H01G 11/46 (2013.01)
- H01G 11/02 (2013.01)

(52) U.S. Cl.
CPC ............ H01G 11/46 (2013.01); H01G 11/70 (2013.01); H01G 11/86 (2013.01); H01G 11/02 (2013.01); Y02E 60/13 (2013.01)

(56) References Cited

PUBLICATIONS

Lan et al., "Phosphorization boosts the capacitance of mixed metal nanosheets arrays for high performance supercapacitor electrodes", Nanoscale, 2018, 10, pp. 11775-11781, Apr. 5, 2018; available online at https://pubs.rsc.org/en/content/articlelanding/2018/NR/C8NR01229F (Year: 2018).*

* cited by examiner

METHOD FOR PREPARING SUPER CAPACITOR ELECTRODE MATERIAL NI DOPED COP₃/FOAM NICKEL

CROSS REFERENCE OF RELATED APPLICATION

The present invention claims priority under 35 U.S.C. 119(a-d) to CN 201910949326.1, filed Oct. 8, 2019.

BACKGROUND OF THE PRESENT INVENTION

Field of Invention

The present invention relates to a technical field of transition metal phosphide preparation and its supercapacitor electrode material, and more particularly to a preparation method and performance exploration of a Ni doped $CoP_3$/Ni foam material applied to the supercapacitor.

Description of Related Arts

Increasingly serious environmental pollution and exhaustion of fossil fuels have accelerated demand for new energy, and prompted scientific researchers from all over the world to continuously find and develop eco-friendly and renewable new energy. Supercapacitors are attractive because of high power density. Furthermore, supercapacitors have significant advantages in cycle life, charge and discharge speed, temperature range, safety performance, etc., which have good application prospects. Supercapacitors are energy storage and conversion devices that accumulate charges through physical adsorption and desorption (electric double layer capacitance) or chemical Faraday reaction (pseudocapacitance). The electrode materials, as a core structure, are mostly carbon materials, metal oxides and conductive polymers, but such materials have problems such as low theoretical specific capacity and poor electrical conductivity. Therefore, it is urgent to develop a new electrode material with high theoretical specific capacity and high electrical conductivity.

As a typical transition metal phosphide, $CoP_3$ is also a skutterudite material which exhibits excellent thermoelectric properties at the middle temperature range. $CoP_3$ is abundant, eco-friendly and cheap. In addition, it has metal characteristics, which provides higher conductivity and comparable high theoretical specific capacity. Conventionally, research emphasis is mainly put on metal-rich and single-phosphorus phase metal phosphides. The American *ACS APPLIED MATERIALS & INTERFACES* (2016, Volume 8, Issue 6, Page 3892) reported $Co_2P$ nano rod-like and flower-like structures prepared by a thermal decomposition method, wherein at a current density of 1 $Ag^{-1}$, the mass specific capacitances are 284 $Fg^{-1}$ and 416 $Fg^{-1}$, respectively. The British *Journal of Materials Chemistry A* (2018, Issue 37, Page 17905) reported a NiCoP nanosheet prepared by a hydrothermal method and a low-temperature phosphating method, wherein at a current density of 1 $Ag^{-1}$, the mass specific capacitance is 1206 $Fg^{-1}$. Since the synthetic methods cannot provide sufficient active sites and cannot solve the problem of charge transfer resistance, the above-mentioned $Co_2P$ and NiCoP have lower supercapacitor performance, which hinders their further application. Based on this, there has been no research on doped phosphorus-rich phase phosphide materials with high specific capacity and high conductivity.

SUMMARY OF THE PRESENT INVENTION

An object of the present invention is to provide a method for preparing an electrode material of a supercapacitor with simple synthesis process, easy control, low cost and high specific capacity, and to apply the electrode material to the supercapacitor for the first time. In Ni doped $CoP_3$/Ni foam prepared by the method is used in the supercapacitor, wherein/means that Ni doped $CoP_3$ is grown in situ on Ni foam by a chemical method. The electrode material has a hierarchical structure and a large specific surface area, which is beneficial to shorten an ion transmission path, reduce an interface resistance between the electrode material and electrolyte, provide more active sites, and provide a higher specific capacity in alkaline electrolyte. The electrode material shows great potential in electrochemical energy storage.

Accordingly, in order to accomplish the above objects, the present invention provides a method for preparing a supercapacitor electrode material Ni-doped $CoP_3$/Ni foam, which uses transition metal salt cobalt chloride, nickel acetate and organic ligand 2-methylimidazole as raw materials, and uses absolute ethanol and deionized water as solvents. Sodium hypophosphite is a phosphorus source, and the Ni foam is a conductive substrate. The Ni-doped $CoP_3$/Ni foam is prepared by low-temperature phosphating, wherein active sites, conductivity and specific surface area of the electrode material are optimized by adjusting an amount of Ni for substituting part of Co.

A supercapacitor electrode material is formed by Ni doped $CoP_3$/Ni foam, wherein/indicates the Ni doped $CoP_3$ is grown in situ on the Ni foam by a chemical method.

A method for preparing a supercapacitor electrode material Ni doped $CoP_3$/Ni foam comprises steps of:

step 1: dissolving a raw material cobalt chloride $CoCl_2 \cdot 6H_2O$ in deionized water to form a solution with a molar concentration of 0.04-0.06 M and dissolving a raw material 2-methylimidazole $C_4H_6N_2$ in deionized water to form a solution with a molar concentration of 0.3-0.5 M: and dispersing the solutions by ultrasonic to form uniform solutions; then pouring the solution of 2-methylimidazole into the solution of cobalt chloride, and ultrasonicating for 5-10 minutes; adding processed sponge-like Ni foam, wherein the Ni foam is ultrasonicated with ethanol and 6 M hydrochloric acid for 20 minutes, washed with deionized water to be neutral and then dried at 50 degrees Celsius; the Ni foam has an area density of 280-420 $g/m^2$ and a pore diameter of 0.2-0.6 mm; after reacting at 20-30 degrees Celsius for 6-12 hours, washing the Ni foam with ionized water and absolute ethanol, and drying under vacuum at 60 degrees Celsius for 12 hours to obtain Co-precursor/Ni foam;

step 2: placing the Co-precursor/Ni foam obtained in the step 1 in absolute ethanol solution containing 0.005-0.02 M nickel acetate $(C_4H_6O_4Ni \cdot 4H_2O)$ for 10-30 minutes, and washing with deionized water and absolute ethanol; then drying under vacuum at 60 degrees Celsius for 12 hours to obtain Ni-doped $Co(OH)_2$/Ni foam precursor; and step 3: placing the Ni-doped $Co(OH)_2$/Ni foam precursor obtained in the step 2 in a quartz boat, and placing the quartz boat at a downstream of a tube furnace, placing 0.5-1.5 g sodium hypophosphite $NaH_2PO_2$ on another quartz boat at an upstream; under nitrogen protection, setting a furnace temperature at 500-600 degrees Celsius and keeping for 1-2 hours; after the furnace temperature is naturally cooled to a room temperature, washing with deionized water and absolute ethanol; then drying under vacuum at 60 degrees Celsius for 12 hours to obtain the Ni-doped $CoP_3$/Ni foam electrode material.

The present invention adopts a low-temperature phosphating process to prepare the Ni-doped $CoP_3$/foamed nickel as the electrode material of the supercapacitor, so as to provide advantages such as simple synthesis process, easy control, low cost and high specific capacity. In addition, a hierarchical porous structure is conducive to rapid ion transfer and enhancing interaction with electrolyte, and is conducive to rapid and sufficient charge and discharge, thereby providing more specific capacity and better rate performance.

DETAILED DESCRIPTION OF THE PREFERRED EMBODIMENT

Referring to the drawings, embodiments of the present invention will be further illustrated.

Embodiment 1

A method for preparing a supercapacitor electrode material Ni doped $CoP_3$/Ni foam comprises steps of:

step 1: respectively dissolving 0.476 g cobalt chloride $CoCl_2.6H_2O$ and 1.312 g 2-methylimidazole $C_4H_6N_2$ in 40 ml deionized water, and dispersing the solutions by ultrasonic to form uniform solutions; then pouring the solution of 2-methylimidazole into the solution of cobalt chloride, and ultrasonicating for 5-10 minutes; adding processed sponge-like Ni foam, wherein the Ni foam is ultrasonicated with ethanol and 6 M hydrochloric acid for 20 minutes, washed with deionized water to be neutral and then dried at 50 degrees Celsius; selecting Ni foam with an area density of 280, 400 and 420 g/m$^2$ and a pore diameter of 0.2, 0.4 and 0.6 mm for studying impacts thereof on the supercapacitor; after reacting at 25 degrees Celsius for 12 hours, washing the Ni foam with ionized water and absolute ethanol, and drying under vacuum at 60 degrees Celsius for 12 hours to obtain Co-precursor/Ni foam:

step 2: placing the Co-precursor/Ni foam obtained in the step 1 in 40 ml absolute ethanol solution containing 48 mg nickel acetate ($C_4H_6O_4Ni.4H_2O$) for 20 minutes, and washing with deionized water and absolute ethanol; then drying under vacuum at 60 degrees Celsius for 12 hours to obtain Ni-doped $Co(OH)_2$/Ni foam precursor; and step 3: placing the Ni-doped $Co(OH)_2$/Ni foam precursor obtained in the step 2 in a quartz boat, and placing the quartz boat at a downstream of a tube furnace; placing 0.5-1.5 g sodium hypophosphite $NaH_2PO_2$ on another quartz boat at an upstream; under nitrogen protection, setting a furnace temperature at 500 degrees Celsius and keeping for 2 hours; after the furnace temperature is naturally cooled to a room temperature, washing with deionized water and absolute ethanol; then drying under vacuum at 60 degrees Celsius for 12 hours to obtain the Ni-doped $CoP_3$/Ni foam electrode material.

Embodiment 2 step 1: respectively dissolving 0.476 g cobalt chloride $CoCl_2.6H_2O$ and 1.312 g 2-methylimidazole $C_4H_6N_2$ in 40 ml deionized water, and dispersing the solutions by ultrasonic to form uniform solutions: then pouring the solution of 2-methylimidazole into the solution of cobalt chloride, and ultrasonicating for 5-10 minutes: adding processed sponge-like Ni foam, wherein the Ni foam is ultrasonicated with ethanol and 6 M hydrochloric acid for 20 minutes, washed with deionized water to be neutral and then dried at 50 degrees Celsius: selecting Ni foam with an area density of 280, 400 and 420 g/m$^2$ and a pore diameter of 0.2, 0.4 and 0.6 mm for studying impacts thereof on the supercapacitor; after reacting at 25 degrees Celsius for 12 hours, washing the Ni foam with ionized water and absolute ethanol, and drying under vacuum at 60 degrees Celsius for 12 hours to obtain Co-precursor/Ni foam;

step 2: placing the Co-precursor/Ni foam obtained in the step 1 in 40 ml absolute ethanol solution containing 96 mg nickel acetate ($C_4H_6O_4Ni.4H_2O$) for 20 minutes, and washing with deionized water and absolute ethanol; then drying under vacuum at 60 degrees Celsius for 12 hours to obtain Ni-doped $Co(OH)_2$/Ni foam precursor: and step 3: placing the Ni-doped $Co(OH)_2$/Ni foam precursor obtained in the step 2 in a quartz boat, and placing the quartz boat at a downstream of a tube furnace, placing 0.5-1.5 g sodium hypophosphite $NaH_2PO_2$ on another quartz boat at an upstream; under nitrogen protection, setting a furnace temperature at 500 degrees Celsius and keeping for 2 hours; after the furnace temperature is naturally cooled to a room temperature, washing with deionized water and absolute ethanol; then drying under vacuum at 60 degrees Celsius for 12 hours to obtain the Ni-doped $CoP_3$/Ni foam electrode material.

Figure 2:
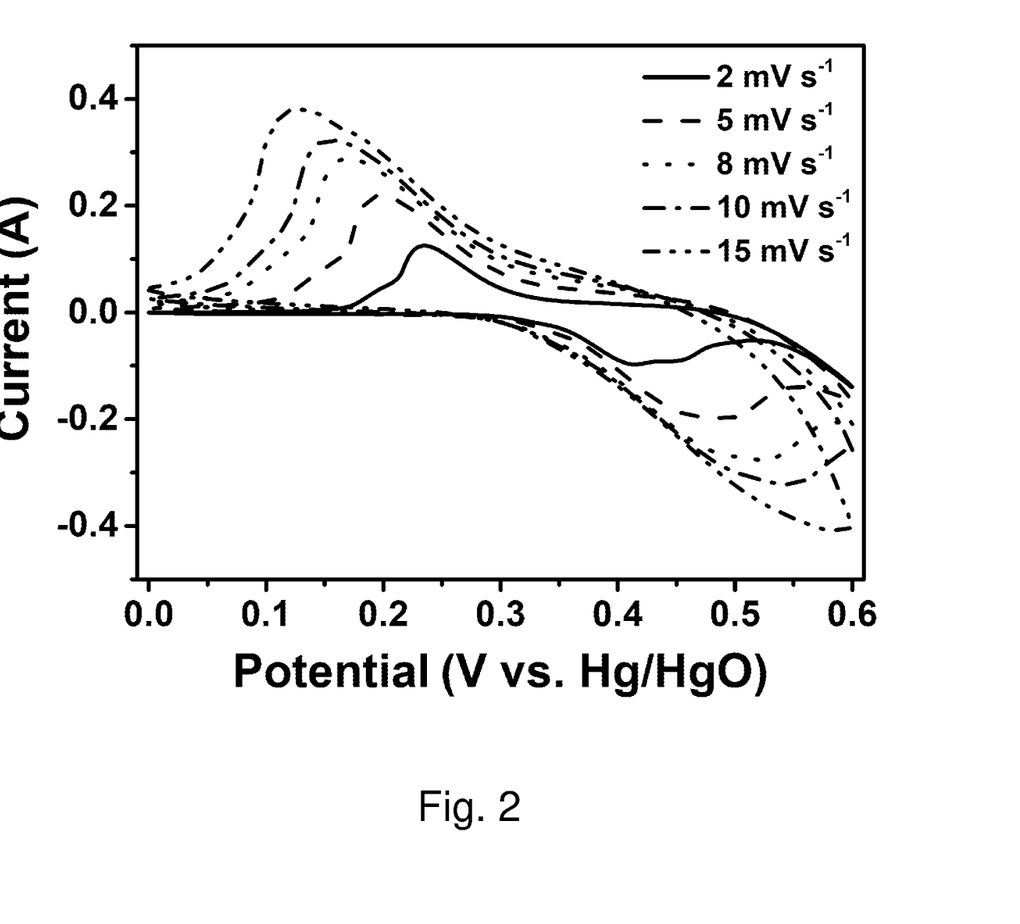
FIG. 2 is cyclic voltammetry curves of the supercapacitor electrode material Ni-doped $CoP_3$/Ni foam obtained in the embodiment 2 at different scanning speed rates.
Figure 3:
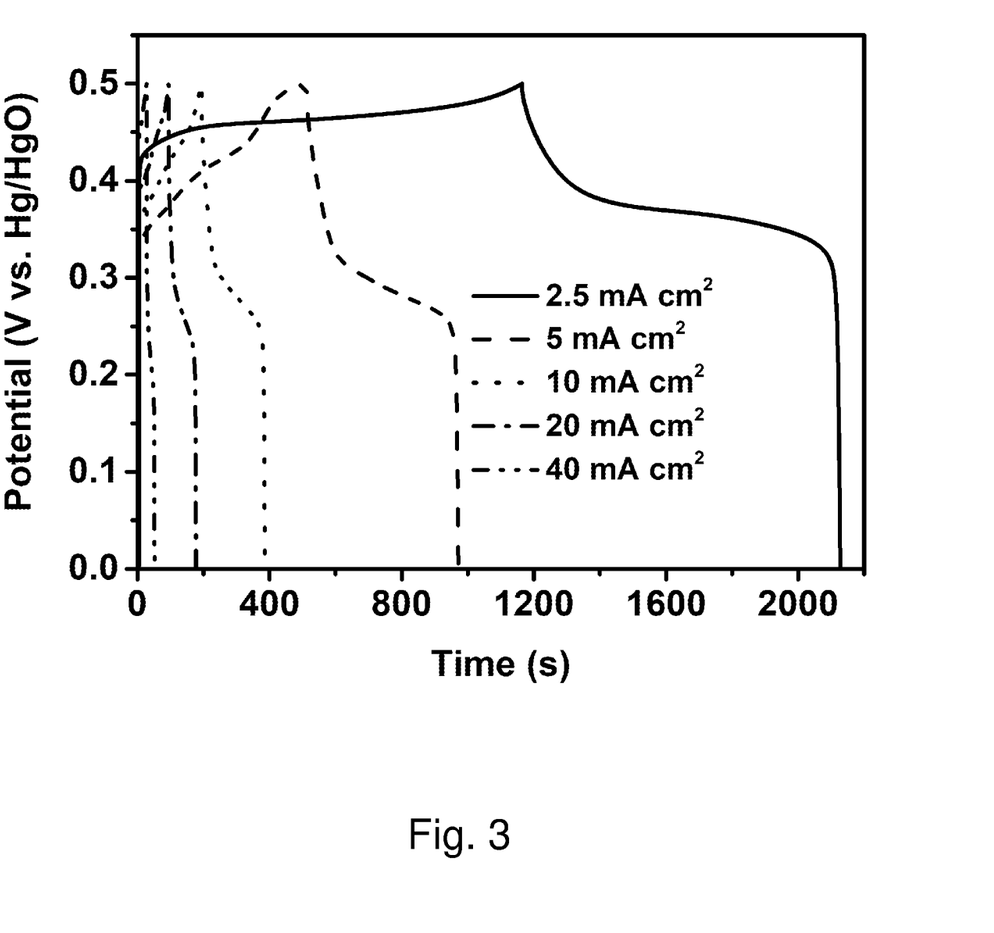
FIG. 3 is constant current charging and discharging curves of the supercapacitor electrode material Ni-doped $CoP_3$/Ni foam obtained in the embodiment 2 at different current densities.
Figure 4:
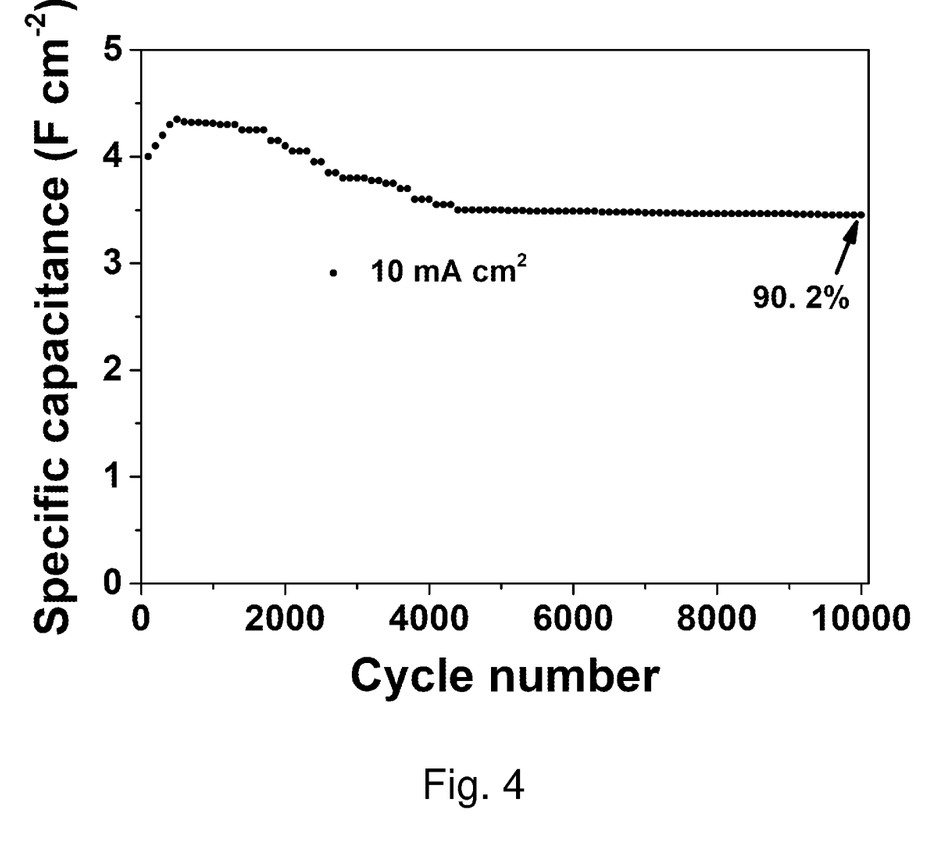
FIG. 4 illustrates a specific capacitance retention rate of the supercapacitor electrode material Ni-doped $CoP_3$/Ni foam obtained in the embodiment 2 after 10,000 cycles of charging and discharging at a current density of 10 mA $cm^{-2}$.

The Ni-doped $CoP_3$/Ni foam electrode material prepared in the embodiment 2 is used as a working electrode, a platinum sheet is used as an auxiliary electrode, and a HgO/Hg electrode is used as a reference electrode, which are all immersed in 6 M KOH electrolyte to form a three-electrode system. A supercapacitor performance test is performed at a potential window of 0-0.6V. FIG. 2 is cyclic voltammetry curves of the Ni-doped $CoP_3$/Ni foam electrode material at different scanning speed rates. All curves have obvious redox peaks, indicating pseudocapacitance characteristics of such material. The curves maintain relatively consistent shapes from 2 mV s$^{-1}$ to 15 mV s$^{-1}$, showing rapid redox reaction. FIG. 3 is test curves of charge and discharge properties at different current densities, wherein all the test curves have discharge platforms, indicating redox capacitance characteristics. When the current density is 2.5 mA cm$^{-2}$, an area specific capacitance is 5.1 F cm$^{-2}$ (a corresponding mass specific capacitance is 2780 F g$^{-1}$). At this time, the area density of the Ni foam used is 400 g/m$^2$, and the pore diameter is 0.6 mm. When the current density is increased to 40 mA cm$^{-2}$, the area specific capacitance is still 3.4 F cm$^{-2}$, showing sufficient rate performance. FIG. 4 shows that the specific capacitance retention rate of the electrode material remains above 90% after 10,000 cycles of continuous charging and discharging at a scanning speed rate of 10 mA cm$^{-2}$, indicating great advantage as the supercapacitor electrode material.

Embodiment 3 step 1: respectively dissolving 0.476 g cobalt chloride CoCl$_2$.6H$_2$O and 1.312 g 2-methylimidazole C$_4$H$_6$N$_2$ in 40 ml deionized water, and dispersing the solutions by ultrasonic to form uniform solutions; then pouring the solution of 2-methylimidazole into the solution of cobalt chloride, and ultrasonicating for 5-10 minutes; adding processed sponge-like Ni foam, wherein the Ni foam is ultrasonicated with ethanol and 6 M hydrochloric acid for 20 minutes, washed with deionized water to be neutral and then dried at 50 degrees Celsius; selecting Ni foam with an area density of 280, 400 and 420 g/m$^2$ and a pore diameter of 0.2, 0.4 and 0.6 mm for studying impacts thereof on the supercapacitor; after reacting at 25 degrees Celsius for 12 hours, washing the Ni foam with ionized water and absolute ethanol, and drying under vacuum at 60 degrees Celsius for 12 hours to obtain Co-precursor/Ni foam;

step 2: placing the Co-precursor/Ni foam obtained in the step 1 in 40 ml absolute ethanol solution containing 144 mg nickel acetate (C$_4$H$_6$O$_4$Ni.4H$_2$O) for 20 minutes, and washing with deionized water and absolute ethanol; then drying under vacuum at 60 degrees Celsius for 12 hours to obtain Ni-doped Co(OH)$_2$/Ni foam precursor; and step 3: placing the Ni-doped Co(OH)$_2$/Ni foam precursor obtained in the step 2 in a quartz boat, and placing the quartz boat at a downstream of a tube furnace, placing 0.5-1.5 g sodium hypophosphite NaH$_2$PO$_2$ on another quartz boat at an upstream: under nitrogen protection, setting a furnace temperature at 500 degrees Celsius and keeping for 2 hours; after the furnace temperature is naturally cooled to a room temperature, washing with deionized water and absolute ethanol; then drying under vacuum at 60 degrees Celsius for 12 hours to obtain the Ni-doped CoP$_3$/Ni foam electrode material.

Embodiment 4 step 1: respectively dissolving 0.476 g cobalt chloride CoCl$_2$.6H$_2$O and 1.312 g 2-methylimidazole C$_4$H$_6$N$_2$ in 40 ml deionized water, and dispersing the solutions by ultrasonic to form uniform solutions; then pouring the solution of 2-methylimidazole into the solution of cobalt chloride, and ultrasonicating for 5-10 minutes; adding processed sponge-like Ni foam, wherein the Ni foam is ultrasonicated with ethanol and 6 M hydrochloric acid for 20 minutes, washed with deionized water to be neutral and then dried at 50 degrees Celsius; selecting Ni foam with an area density of 280, 400 and 420 g/m$^2$ and a pore diameter of 0.2, 0.4 and 0.6 mm for studying impacts thereof on the supercapacitor; after reacting at 25 degrees Celsius for 12 hours, washing the Ni foam with ionized water and absolute ethanol, and drying under vacuum at 60 degrees Celsius for 12 hours to obtain Co-precursor/Ni foam:

step 2: placing the Co-precursor/Ni foam obtained in the step 1 in 40 ml absolute ethanol solution containing 192 mg nickel acetate (C$_4$H$_6$O$_4$Ni.4H$_2$O) for 20 minutes, and washing with deionized water and absolute ethanol; then drying under vacuum at 60 degrees Celsius for 12 hours to obtain Ni-doped Co(OH)$_2$/Ni foam precursor: and step 3: placing the Ni-doped Co(OH)$_2$/Ni foam precursor obtained in the step 2 in a quartz boat, and placing the quartz boat at a downstream of a tube furnace; placing 0.5-1.5 g sodium hypophosphite NaH$_2$PO$_2$ on another quartz boat at an upstream; under nitrogen protection, setting a furnace temperature at 500 degrees Celsius and keeping for 2 hours: after the furnace temperature is naturally cooled to a room temperature, washing with deionized water and absolute ethanol; then drying under vacuum at 60 degrees Celsius for 12 hours to obtain the Ni-doped CoP$_3$/Ni foam electrode material.

XRD and supercapacitor performance tests are performed on the Ni-doped CoP$_3$/Ni foam material prepared in the embodiments 1-4. Results are shown in FIGS. 1-5.

Figure 1:
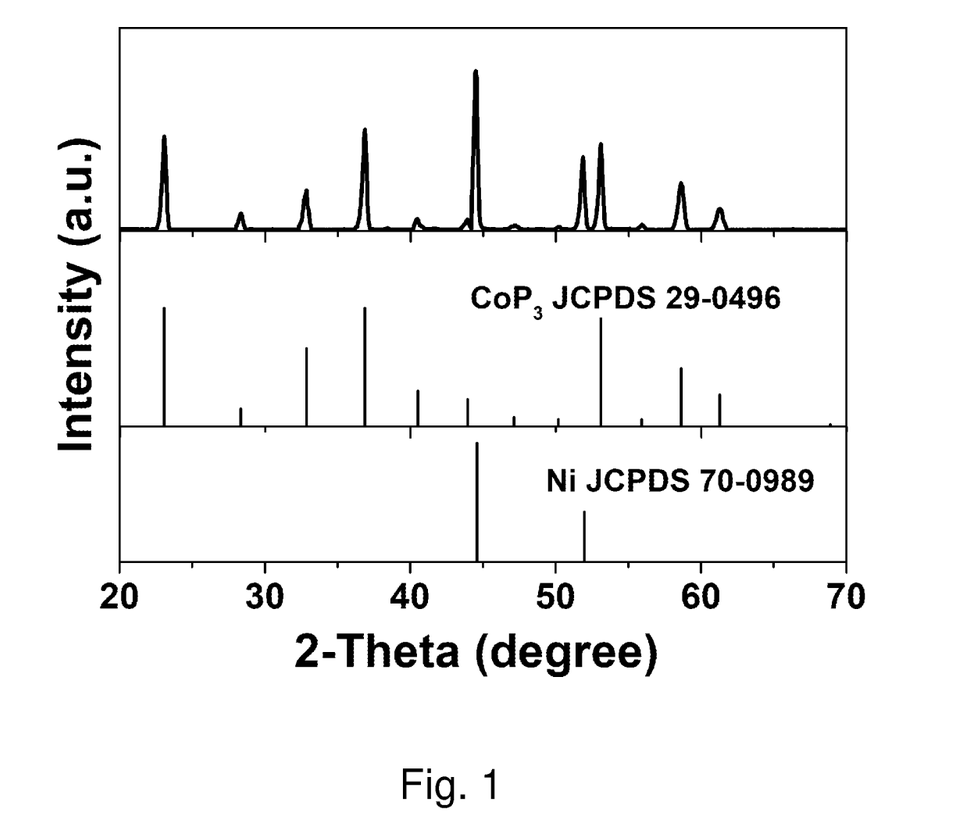
FIG. 1 is an X-ray diffraction pattern of a supercapacitor electrode material Ni-doped $CoP_3$/Ni foam obtained in embodiment 2; wherein X-ray diffraction characteristic peaks are well matched with standard cards $CoP_3$ JCPDS (24-0496) and Ni JCPDS (70-0989); because an amount of incorporated Ni is low, only characteristics diffraction peaks of the Ni foam and the $CoP_3$ appear on spectrum, which proves that samples prepared in the embodiment 2 are indeed Ni-doped $CoP_3$/Ni foam supercapacitor electrode materials.

FIG. 1 is an X-ray diffraction pattern of a supercapacitor electrode material Ni-doped CoP$_3$/Ni foam obtained in embodiment 2; wherein X-ray diffraction characteristic peaks are well matched with standard cards CoP$_3$ JCPDS (24-0496) and Ni JCPDS (70-0989); because an amount of incorporated Ni is low, only characteristics diffraction peaks of the Ni foam and the CoP$_3$ appear on spectrum, which proves that samples prepared in the embodiment 2 are indeed Ni-doped CoP$_3$/Ni foam supercapacitor electrode materials.

Figure 5:
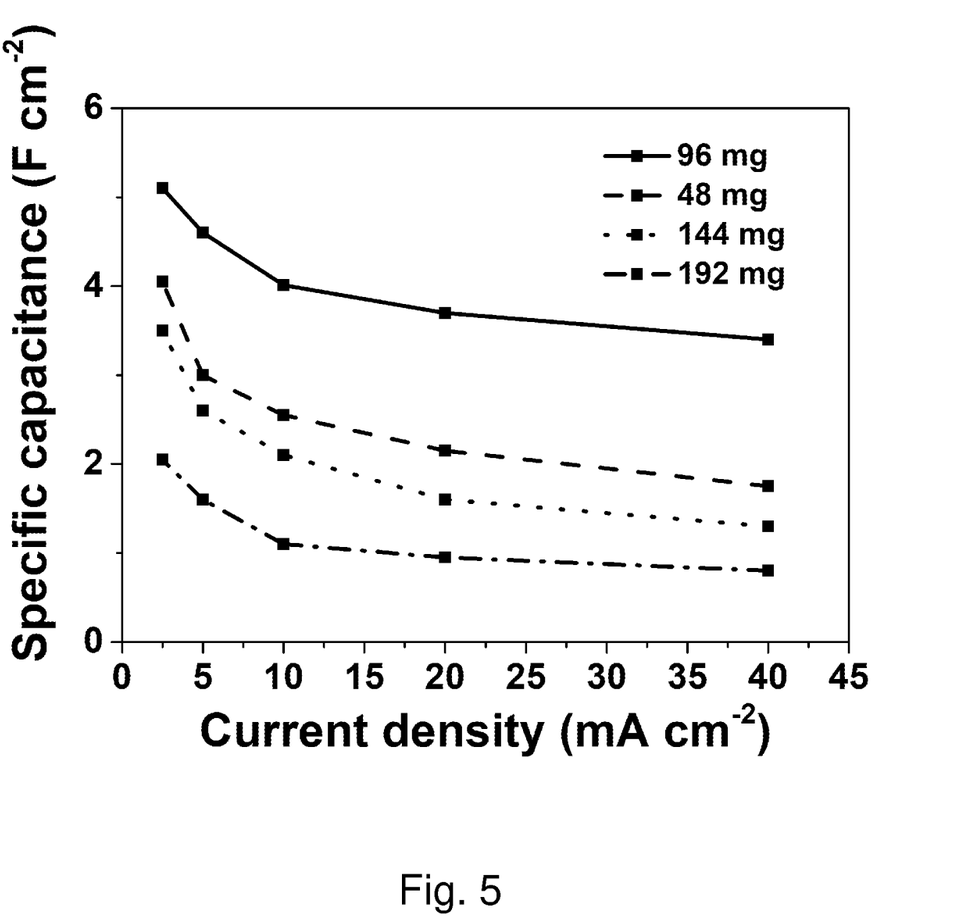
FIG. 5 illustrates specific capacities of supercapacitor electrode materials Ni-doped $CoP_3$/Ni foam obtained in embodiments 1-4 at different current densities.

FIG. 2 is cyclic voltammetry curves of the Ni-doped CoP$_3$/Ni foam electrode material prepared in the embodiment 2 at different scanning speed rates. All curves have obvious redox peaks, indicating pseudocapacitance characteristics of such material. The curves maintain relatively consistent shapes from 2 mV s$^{-1}$ to 15 mV s$^{-1}$, showing rapid redox reaction. FIG. 3 is test curves of charge and discharge properties of the Ni-doped CoP$_3$/Ni foam electrode material prepared in the embodiment 2 at different current densities (2.5 mA cm$^{-2}$, 5 mA cm$^{-2}$, 10 mA cm$^{-2}$, 20 mA cm$^{-2}$ and 40 mA cm$^{-2}$), wherein all the test curves have discharge platforms, further indicating redox capacitance characteristics. When the current density is 2.5 mA cm$^{-2}$, an area specific capacitance is 5.1 F cm$^{-2}$ (a corresponding mass specific capacitance is 2780 F g$^{-1}$). At this time, the area density of the Ni foam used is 400 g/m$^2$, and the pore diameter is 0.6 mm. When the current density is increased to 40 mA cm$^{-2}$, the area specific capacitance is still 3.4 F cm$^{-2}$, showing sufficient rate performance. FIG. 4 shows that the specific capacitance retention rate of the electrode material remains above 90% after 10.000 cycles of continuous charging and discharging when a current density of the Ni-doped CoP$_3$/Ni foam electrode material prepared in the embodiment 2 is 10 mA cm$^{-2}$, indicating great advantage as the supercapacitor electrode material. FIG. 5 illustrates specific capacities of the Ni-doped CoP$_3$/Ni foam electrode materials obtained in embodiments 1-4 at current densities of 2.5 mA cm$^{-2}$. 5 mA cm$^{-2}$, 10 mA cm$^{-2}$, 20 mA cm$^{-2}$ and 40 mA cm$^{-2}$. Referring to the drawings, the Ni-doped CoP$_3$/Ni foam electrode material obtained in the embodiment 2 has the largest specific capacity at each current density. The Ni-doped CoP$_3$/Ni foam electrode materials prepared by the present invention have excellent supercapacitor performance, and the sample prepared in the embodiment 2 has the best performance.

What is claimed is:

1. A method for preparing a supercapacitor electrode material Ni doped $CoP_3$/Ni foam, comprising steps of:

step 1: dissolving a raw material cobalt chloride $CoCl_2 \cdot 6H_2O$ in deionized water to form a solution A with a molar concentration of 0.04-0.06M and dissolving a raw material 2-methylimidazole $C_4H_6N_2$ in deionized water to form a solution B with a molar concentration of 0.3-0.5M; then pouring the solution B into the solution A, and ultrasonicating for 5-10 minutes; adding processed sponge-like Ni foam, wherein the Ni foam is ultrasonicated with ethanol and 6M hydrochloric acid for 20 minutes, washed with deionized water to be neutral and then dried at 50 degrees Celsius; the Ni foam has an area density of 280-420 $g/m^2$ and a pore diameter of 0.2-0.6 mm; after reacting at 20-30 degrees Celsius for 6-12 hours, washing the Ni foam with ionized water and absolute ethanol, and drying under vacuum at 60 degrees Celsius for 12 hours to obtain Co-precursor/Ni foam;

step 2: placing the Co-precursor/Ni foam obtained in the step 1 in absolute ethanol solution containing 0.005-0.02M nickel acetate ($C_4H_6O_4Ni \cdot 4H_2O$) for 10-30 minutes, and washing with deionized water and absolute ethanol; then drying under vacuum at 60 degrees Celsius for 12 hours to obtain Ni-doped $Co(OH)_2$/Ni foam precursor; and step 3: placing the Ni-doped $Co(OH)_2$/Ni foam precursor obtained in the step 2 in a quartz boat, and placing the quartz boat at a downstream of a tube furnace; placing 0.5-1.5 g sodium hypophosphite $NaH_2PO_2$ on another quartz boat at an upstream; under nitrogen protection, setting a furnace temperature at 500-600 degrees Celsius and keeping for 1-2 hours; after the furnace temperature is naturally cooled to a room temperature, washing with deionized water and absolute ethanol; then drying under vacuum at 60 degrees Celsius for 12 hours to obtain the Ni-doped $CoP_3$/Ni foam electrode material.

* * * * *